(12) United States Patent
Hechtman et al.

(10) Patent No.: US 11,907,825 B2
(45) Date of Patent: Feb. 20, 2024

(54) TRAINING NEURAL NETWORKS USING DISTRIBUTED BATCH NORMALIZATION

(71) Applicant: Google LLC, Mountain View, CA (US)

(72) Inventors: Blake Alan Hechtman, Mountain View, CA (US); Sameer Kumar, Mountain View, CA (US)

(73) Assignee: Google LLC, Mountain View, CA (US)

( * ) Notice: Subject to any disclaimer, the term of this patent is extended or adjusted under 35 U.S.C. 154(b) by 1045 days.

(21) Appl. No.: 16/659,543

(22) Filed: Oct. 21, 2019

(65) Prior Publication Data
US 2020/0125949 A1 Apr. 23, 2020

Related U.S. Application Data

(60) Provisional application No. 62/748,286, filed on Oct. 19, 2018.

(51) Int. Cl.
| | |
|---|---|
| *G06N 3/04* | (2023.01) |
| *G06N 3/084* | (2023.01) |
| *G06N 3/044* | (2023.01) |
| *G06N 3/08* | (2023.01) |
| *G06V 10/82* | (2022.01) |

(52) U.S. Cl.
CPC ............... *G06N 3/044* (2023.01); *G06N 3/04* (2013.01); *G06N 3/08* (2013.01); *G06N 3/084* (2013.01); *G06V 10/82* (2022.01)

(58) Field of Classification Search
CPC ........... G06N 3/04; G06N 3/084; G06N 3/08; G06N 3/044
See application file for complete search history.

(56) References Cited

U.S. PATENT DOCUMENTS 10,055,692 B1    8/2018    McLaren et al.

OTHER PUBLICATIONS

Dean, J., Corrado, G., Monga, R., Chen, K., Devin, M., Mao, M., . . . & Ng, A. (2012). Large scale distributed deep networks. Advances in neural information processing systems, 25. (Year: 2012).*

(Continued)

*Primary Examiner* — Ying Yu Chen
*Assistant Examiner* — Lokesha G Patel
(74) *Attorney, Agent, or Firm* — Fish & Richardson P.C.

(57) ABSTRACT

Methods, systems, and apparatus, including instructions encoded on storage media, for performing reduction of gradient vectors for distributed training of a neural network. One of the methods includes receiving, at each of the plurality of devices, a respective batch; performing, by each device, a forward pass comprising, for each batch normalization layer: generating, by each of the devices, a respective output of the corresponding other layer for each training example in the batch, determining, by each of the devices, a per-replica mean and a per-replica variance; determining, for each sub-group, a distributed mean and a distributed variance from the per-replica means and the per-replica variances for the devices in the sub-group; and applying, by each device, batch normalization to the respective outputs of the corresponding other layer generated by the device using the distributed mean and the distributed variance for the sub-group to which the device belongs.

19 Claims, 4 Drawing Sheets

(56) References Cited

OTHER PUBLICATIONS

Ioffe, S., & Szegedy, C. (Mar. 2, 2015). Batch normalization: Accelerating deep network training by reducing internal covariate shift. arXiv.org. Retrieved Jan. 11, 2023, from https://arxiv.org/abs/1502.03167 (Year: 2015).*
Schilling, F. (2016). The Effect of Batch Normalization on Deep Convolutional Neural Networks (Dissertation). Retrieved from http://urn.kb.se/resolve?urn=urn:nbn:se:kth:diva-191222 (Year: 2016).*
Jia, X., Song, S., He, W., Wang, Y., Rong, H., Zhou, F., . . . & Chu, X. (2018). Highly scalable deep learning training system with mixed-precision: Training imagenet in four minutes. arXiv preprint arXiv:1807.11205. (Year: 2018).*
Abadi et al. "TensorFlow: Large-scale machine learning on heterogeneous systems," arXiv1603.04467v2, Mar. 16, 2016, 19 pages.
Akiba et al. "Extremely large minibatch SGD: training resnet-50 on imagenet in 15 minutes," arXiv1711.04325, Nov. 12, 2017, 4 pages.
Chen et al. "Revisiting distributed synchronous SGD," arXiv 1604.00981v3, Mar. 21, 2017, 10 pages.
Dean et al. "Large scale distributed deep networks," NIPS, Dec. 2012, 9 pages.
github.com' [online] |Baidu-research / baidu-allreduce, Last updated: Feb. 24, 2017 [retrieved from internet: Jan. 27, 2020] Retrieved from Internet: URL< https://github.com/baidu-research/baidu-allreduce> 2 pages.
Goyal et al. "Accurate, large minibatch SGD: training imagenet in 1 hour," arXiv 1706.02677v2, Apr. 30, 2018, 12 pages.
He et al. "Deep residual learning for image recognition," arXiv 1512.03385, Dec. 10, 2015, 12 pages.
Hoffer et al. "Train longer, generalize better: closing the generalization gap in large scale batch training of neural networks," NIPS, Dec. 2017, 11 pages.
Ioffe et al. "Batch Normalization: Accelerating Deep Network Training by Reducing internal Covariate Shift," arXiv 1502.03167v3, Mar. 2, 2015, 11 pages.
Jia et al. "Highly scalable deep learning training system with mixed-precision: Training imagenet in four minutes," arXiv 1807.11205, Jul. 30, 2018, 9 pages.
Jouppi et al. "In-datacenter performance analysis of a tensor processing unit," Proceedings of the 44th Annual International Symposium on Computer Archtecture, 12 pages.
Keskar et al. "On large-batch training for deep learning: Generalization gap and sharp minima," arXiv 1609.04836v2, Feb. 9, 2017, 16 pages.
Krizhevsky. "One weird trick for parallelizing convolutional neural networks," arXiv v2, Apr. 26, 2014, 7 pages.
Russakovsky et al. "ImageNet large scale visual recognition challenge," International Journal of Computer Vision, 115(3). Apr. 11, 2015, 42 pages.
Smith et al. "Don't decay the learning rate, increase the batch size," arXiv 1711.00489, Nov. 1, 2017, 11 pages.
Smith et al. "Super-convergence: Very fast training of residual networks using large learning rates," arXiv v1, Aug. 23, 2017, 15 pages.
Szegedy et al. "Going deeper with convolutions," arXiv 1409.4842v1, Sep. 17, 2014, 12 pages.
Wu et al. "Group normalization," arXiv 1803.08494v1, Mar. 22, 2018, 10 pages.
You et al. "Scaling SGD batch size to 32k for imagenet training," arXiv 1708.038888v3, Sep. 13, 2017, 8 pages.

* cited by examiner

TRAINING NEURAL NETWORKS USING DISTRIBUTED BATCH NORMALIZATION

CROSS-REFERENCE TO RELATED APPLICATION

This application claims priority to U.S. Provisional Application No. 62/748,286, filed on Oct. 19, 2018. The disclosure of the prior application is considered part of and is incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

A neural network can be trained on a distributed network that is configured to train multiple replicas of the neural network on different batches of training data. A distributed network can define various topologies, such as a mesh or a torus topology, and can be of arbitrary dimension. The distributed network can train each replica individually and in parallel and update network parameter values for the neural network based on the results of the training.

SUMMARY

This specification describes technologies relating to distributed training of neural networks and, more particularly, to the distributed training of a neural network that includes one or more batch normalization layers. In particular, the technologies described in this specification replace the operations conventionally performed by a batch normalization layer with distributed batch normalization. In distributed batch normalization, batch normalization is applied using distributed means and variances instead of per-replica means and variances computed locally by the devices. The distributed means and variances that are used by a given device are determined based on per-replica means and variances computed by the given device and per-replica means and variances computed by other devices that are in the same sub-group as the given device.

Particular implementations of the subject matter described in this specification can be implemented so as to realize one or more of the following advantages. Batch normalization (BN) is a critical part of training many different kinds of neural networks. In particular, by normalizing layer outputs using batch statistics, BN accelerates and improves the effectiveness of the training process. One reason that this is occurs is because batch normalization reduces internal covariate shift during training, i.e., by preventing the distribution of a given layer's inputs from changing during the training.

In a distributed training setting, a common practice is to perform BN per device, i.e., to use the per-replica mean and variance to perform batch normalization during training. However, this can reduce the accuracy of the trained neural network and decrease the effectiveness of the distributed training process. In particular, the per-device batch size may not be sufficient for the per-replica mean and variance to confer the full benefit of batch normalization, i.e., because with small per-device batch sizes the per-replica mean and variance are not good approximations of the global mean and variance among all of the training data.

The techniques described in this specification improve the effectiveness of the training process by introducing a distributed mean and distributed variance that are used to perform batch normalization in place of the per-replica mean and variance. Computing the distributed statistics over only sub-groups of the devices (instead of only on one device or on all of the devices) decouples the BN effective batch size (the number of training examples considered when computing the statistics used to normalize layer outputs) from the global batch size and the number of devices being used. This significantly improves the performance, e.g., the accuracy, of the trained neural network because the distributed statistics balance a good approximation of the global statistics and also permit some randomness to enable training to a higher accuracy. Additionally, the number of devices in each sub-group is generally small relative to the total number of devices. For example, each sub-group may only have 2, 4, or 8 devices while the total number of devices is 512 or 1024. Thus, computing the distributed statistics introduces only a small cross-device communication cost into the training process. Accordingly, the described techniques significantly improve the effectiveness of the distributed training process (and the performance of the resulting trained neural network) with only a minimal additional cross-device communication cost during the training.

Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
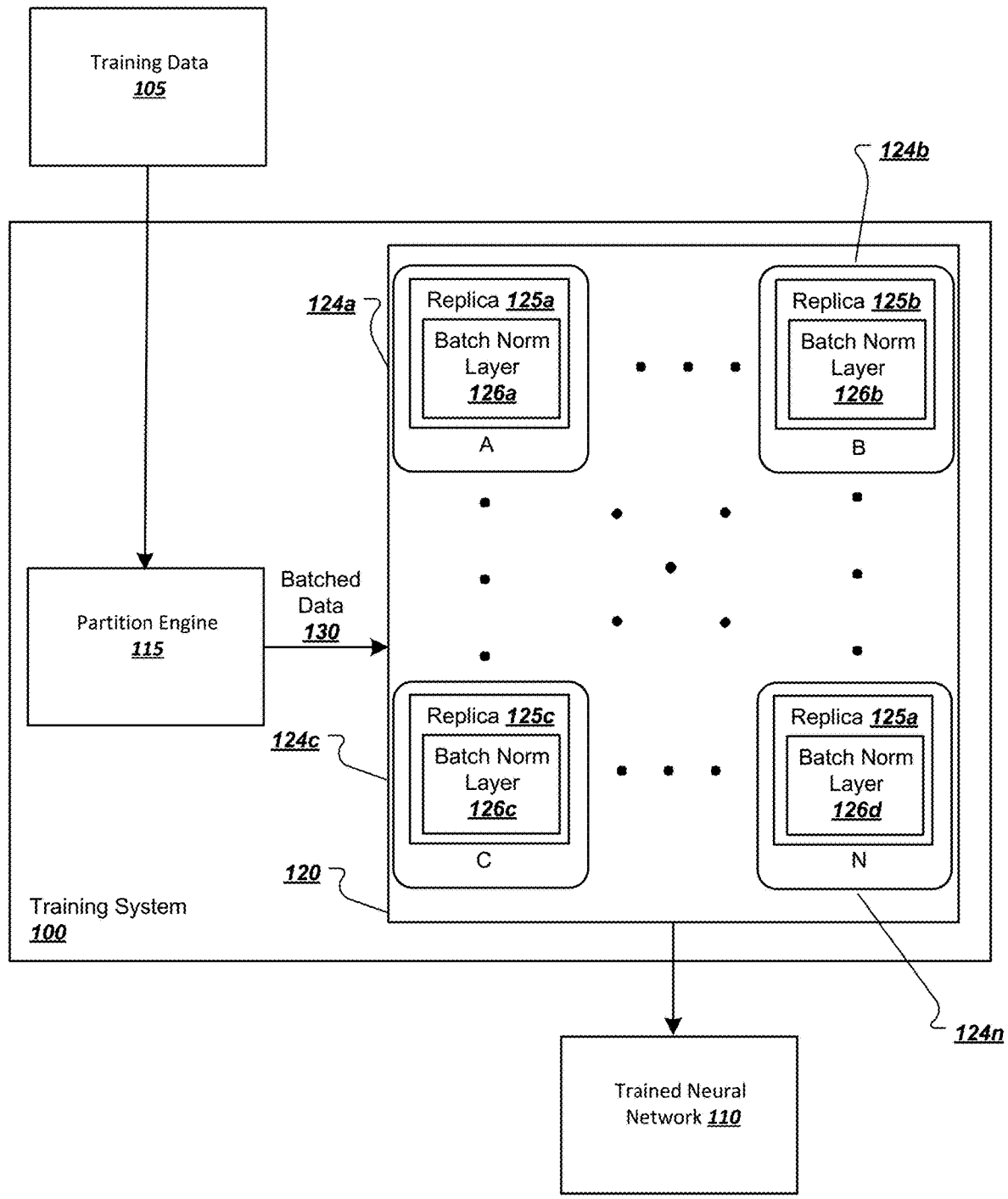
FIG. 1 illustrates an example training system.

FIG. 1 illustrates an example training system 100. The training system 100 can receive training data 105 for training a neural network and output data specifying the trained neural network 110.

The neural network can be trained to perform any kind of machine learning task, i.e., can be configured to receive any kind of digital data input and to generate any kind of score, classification, or regression output based on the input.

In some cases, the neural network is a neural network that is configured to perform an image processing task, i.e., receive an input image and to process the input image to generate a network output for the input image. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

The training system 100 can receive the training data in any appropriate manner. For example, the training system 100 can receive training data as an upload from a remote user of the system over a data communication network, e.g., using an application programming interface ("API") made available by the system 100. In some implementations, the training system can maintain a repository of training data and the system 100 can receive an input from a user specifying which data in the repository to use as the training data 105.

The data specifying the trained neural network 110 can specify the trained (or "learned") parameter values for the neural network 110.

In particular, the system 100 can output the data specifying the trained neural network 110 to a user of the system e.g., the user that submitted the training data, for use in processing new input data. Alternatively or in addition to generating the data specifying the trained neural network 110, the training system 100 can instantiate an instance of the trained neural network having the same architecture and learned parameter values. The instance of the trained neural network can be executed to generate new outputs to perform the machine learning task.

The training system 100 includes a partition engine 115 and a machine learning replica network 120 that includes multiple devices 124a-n that are used to train the neural network in a distributed manner.

The partition engine 115 can be configured to receive the training data 105 and generate batched data 130 that includes multiple batches of training data. The batches of training data in the batched data 130 are generally all the same size, i.e., include the same number of training examples, but include different training examples selected from the training data 105.

During the training, the partition engine can repeatedly send, to each device 124a-n on the replica network 120, a respective batch of training data to process through a respective neural network replica 125a-n maintained by the device 124a-n. Each neural network replica 125a-n has the same architecture as the neural network being trained, i.e., is an identical instance of the neural network.

Each device 124a-n includes one or more processing units configured to receive a batch of training data, process the batch through a respective replica of a neural network to generate a network output, and then use the network output to determine an update to the parameters of the neural network. The processing units can be implemented on one or more integrated circuits ("chips") of one or more computing devices.

In other words, the devices 124a-n can be any computer hardware devices capable of independently performing these neural network training operations and may be heterogenous or homogenous. For example, the devices may include special purpose neural network hardware accelerators (e.g., Tensor Processing Unit (TPUs) or other hardware accelerators that are specially designed to optimize neural network computation), graphics processing units (GPUs), central processing units (CPUs), or both, or other appropriate computer hardware.

The devices 124*a-n* can be configured to train the neural network to optimize an objective function through any appropriate machine learning training technique, e.g., by any appropriate supervised learning technique, unsupervised learning technique, semi-supervised learning technique, or reinforcement learning technique.

As a particular example, the neural network can be an image processing neural network and the system can train the neural network through supervised learning on training examples that each include (i) one or more input images and (ii) a ground truth output for the one or more input images, i.e., the "target" output that should be generated by the neural network by processing the one or more input images. The system can train the neural network through supervised learning to minimize a loss that measures an error between the outputs generated by the neural network and the ground truth outputs.

Generally, however, upon receiving a batch of training examples, each device trains the neural network by performing gradient descent to calculate gradients of the objective function using the replica maintained by the device. An update to the network parameters can then be determined from the gradients calculated by the devices by applying an optimizer, e.g., the stochastic gradient descent optimizer, the Adam optimizer, the rmsProp optimizer, or a learned optimizer, to the gradients determined by the devices.

The machine learning replica network 120 includes one or more high-speed communication links, e.g., wired or wireless links, between the plurality of devices 124*a-n*.

At each iteration of the training process, each device 124*a-n* receives a respective batch of training examples and determines, using the replica maintained by the device, an update to the network parameters of the neural network for the training examples in the batch.

Each device 124*a-n* can determine an update by performing a forward pass through the neural network replica 125*a-n* maintained by the device on the batch of training examples to generate a respective network output for each training example and then performing a backward pass through the neural network using the network outputs.

When certain criteria are satisfied, e.g., after a certain number of iterations have been performed by the devices, the devices update the current values of the network parameters using the updates that have accumulated since the previous time the network parameter values were updated. Techniques for updating the parameter values are described in more detail below.

The neural network being trained includes one or more batch normalization layers. Accordingly, each replica 125*a-n* also includes one or more batch normalization layers, e.g., batch normalization layers 126*a-n*.

A batch normalization layer is a layer that, during the training of the neural network, receives as input the outputs generated by a corresponding other layer in the neural network for training examples in the batch, generates a batch normalization layer output for each of the training examples, and then provides the batch normalization layer outputs as input to another layer in the neural network.

In particular, conventionally, a batch normalization layer would perform the following operations:

| Algorithm 1: Batch Normalizing Transform. applied to activation x over a mini-batch. | |
|---|---|
| Input: | Values of x over a mini-batch: B = {$x_{1...m}$}; Parameters to be learned: $\gamma$, $\beta$ |
| Output: | {yi = $BN_{\gamma,\beta}(x_i)$} |
| $\mu_B \leftarrow \frac{1}{m}\sum_{i=1}^{m} x_i$ | // mini-batch mean |
| $\sigma_B^2 \leftarrow \frac{1}{m}\sum_{i=1}^{m}(x_i - \mu_B)^2$ | // mini-batch variance |
| $\hat{x}_i \leftarrow \frac{x_i - \mu_B}{\sqrt{\sigma_B^2 + \epsilon}}$ | // normalize |
| $y_i \leftarrow \gamma\hat{x}_i + \beta \equiv BN_{\gamma,\beta}(x_i)$ | // scale and shift | where the x's are the outputs of the corresponding other layer, the y's are the batch normalization outputs that are provided as output of the batch normalization layer, m is the total number of training examples in the batch, $\epsilon$ is a constant added to the mini-batch variance for numerical stability, and $\gamma$ and $\beta$ are parameters of the batch normalization layer that are learned during training of the neural network.

In other words, if the devices were employing conventional batch normalization, each device would compute a per-replica mean $\mu\beta$ of the outputs of the corresponding other layer, use the per-replica mean to compute a per-replica variance $\sigma^2\beta$ of the outputs of the corresponding other layer, normalize each output of the corresponding other layer using the per-replica mean and variance, and then scale and shift each normalized output using $\gamma$ and $\beta$ to generate the batch normalized output.

The way that the batch normalization layer computes the per-replica mean and variance depends on the type of output the corresponding other layer generates.

When the corresponding other layer is a fully-connected layer that generates vectors having multiple dimensions, the batch normalization layer computes the means and variances independently for each dimension and also learns a separate $\gamma$ and $\beta$ for each dimension. In other words, the batch normalization layer computes a respective mean of the values along each dimension of the corresponding other layer outputs in the batch.

When the corresponding other layer generates tensors that are made up of multiple feature maps, i.e., the other layer is a convolutional layer that applies a convolution to generate multiple feature maps, the batch normalization layer computes the means and variances independently for each feature map and also learns a separate $\gamma$ and $\beta$ for each feature map, i.e., instead of computing the means and variances independently for each spatial location in each feature map and also learning a separate $\gamma$ and $\beta$ for each spatial location in each feature map.

Additionally, each batch normalization layer can either be inserted directly after a linear transformation, i.e., receive as input the outputs of another layer that has no activation function, or after a non-linearity, i.e., the other layer applies both a linear transformation and an activation function.

Using the techniques described in this specification, however, each device 124*a-n* uses a distributed mean and a distributed variance in place of the mini-batch mean and variance when performing the operations of the batch normalization layer 126a-n, i.e., when normalizing the x's in the corresponding layer outputs for the training examples in the batch received by the device.

The distributed mean and distributed variance are computed from the per-replica means and variances determined by the devices in the same sub-group as the given device. In other words, the devices 124a-n are partitioned into sub-groups during the training of the neural network. For a given batch normalization layer, each device 124a-n computes a per-replica mean and variance from the corresponding layer outputs for the training examples in the batch received by the device. The system then determines, for each sub-group, a distributed mean and a distributed variance from the per-replica means and the per-replica variances for the devices in the sub-group. Each device then uses the distributed means and variances (for the sub-group to which the device belongs) when applying batch normalization to the device's corresponding layer outputs, i.e., to normalize and then scale and shift the corresponding layer outputs for the training examples in the batch assigned to the device, in place of the per-replica means and variances.

Distributed batch normalization is described in more detail below with reference to FIGS. 2-4.

Distributed batch normalization is advantageous for several reasons. In particular, as described above, batch normalization (BN) is a critical part of effectively training many image classification models and other types of neural networks at least in part because including batch normalization layers in a neural network allows higher learning rates to be applied effectively when updating parameter values during training.

In a distributed training setting, a common practice is to perform BN per replica, i.e., to directly use the per-replica means and variances, which reduces the cross-device communication cost. However, the per-replica batch size has a critical effect on the final validation accuracy achieved in the model. As a particular example, it has been observed that when the batch size per replica is below 32, a ResNet-50 image classification model does not converge to peak validation accuracy.

When scaling up to a very large number of workers, i.e., devices on the network, via data parallelism, either the global batch size must be scaled up linearly or the per-replica batch size must be scaled down to allow each device to have sufficiently different training data from each other device at any given iteration of the process. Additionally, prior work has shown that validation accuracy suffers at larger global batch sizes. Thus, it is desirable keep the per-replica batch size small, e.g., to 16 training examples per device, even though this is below the threshold required for optimal batch normalization performance. The described techniques, i.e., distributed batch normalization, allow the system to train the neural network to peak validation accuracy (i.e., to take full advantage of the benefits afforded by batch normalization) while keeping the per-replica batch size small to allow scaling up to a large number of workers effectively with only minimal additional computational overhead. In other words, by using distributed batch normalization, the positive impact of batch normalization on training can be maximized while keeping per-replica batch sizes small and with only minimal additional overhead.

Figure 2:
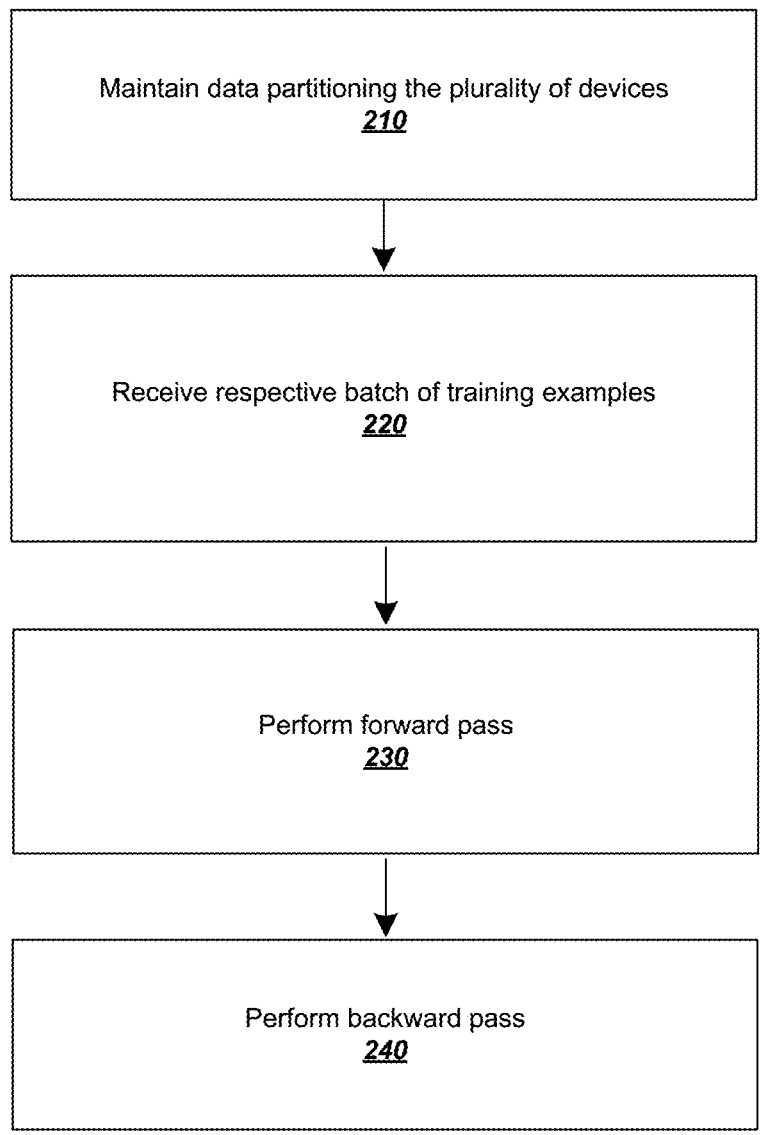
FIG. 2 is a flow chart of an example process for distributed training of a neural network.

FIG. 2 is a flow chart of an example process 200 for distributed training of a neural network. For convenience, the example process will be described as being performed by a system of devices programmed appropriately in accordance with this specification. For example, devices on a replica network, e.g., the devices 124a-n of the replica network 120 of FIG. 1, appropriately programmed, can perform the example process of FIG. 2.

The system maintains data partitioning the devices in the system into sub-groups (step 210). Each sub-group generally includes the same number of devices and the number of devices in the sub-groups is generally small relative to the total number of devices in the system. In particular, the number of devices in each sub-group is greater than one and significantly less than the total number of devices, e.g., no more than one sixty-fourth than the total number of devices. For example, there may be 512 or 1024 total devices but only 2, 4, or 8 devices in each sub-group. Additionally, each device is generally assigned to exactly one sub-group.

The system can repeatedly perform steps 220-240 of the process 200 on different batches of training data to train the neural network, i.e., to determine trained values of the network parameters.

Each device in the system receives a respective batch of training examples (step 220). Each batch generally includes the same number of training examples (but the training examples in each batch are generally different from those in the other batches) that are selected from a larger set of training data.

Each device in the system performs a forward pass through the replica of the neural network that is maintained by the device to determine a respective network output for each training example in the batch received by the device (step 230). That is, each device processes each training example in the batch through the replica maintained by the device to generate a network output for each training example. To perform the forward pass, the system computes a respective output for each layer of the replica by performing the operations specified by the layer on the inputs specified by the layer. Because the system employs distributed batch normalization, during the forward pass each device communicates with the other devices in the same sub-set as the device in order to determine the batch normalized outputs for each batch normalization layer in the neural network. In particular, each device determines distributed means and variances and then uses those distributed means and variances in place of per-replica means and variances when applying batch normalization. Applying distributed batch normalization is described in more detail below with reference to FIGS. 3 and 4.

Each device then performs a backward pass through the replica maintained by the device to determine an update to the parameters of the neural network for the training example in the batch received by the device (step 240).

That is, each device backpropagates a gradient of the objective function being used to train the neural network, i.e., a function that measures errors in the neural network outputs generated for the training examples in the batch, in order to determine the update for the training examples. While backpropagating gradients through the batch normalization layers, each device again uses the distributed means and variances in place of per-replica means and variances.

When update criteria are satisfied, the system can then apply the updates determined by the devices to the parameters in any of a variety of ways. For example, each device can send the update determined by the device to a centralized parameter server, which can combine, i.e., add or average, the updates, apply the combined update to the parameters, and then provide the updated parameters to the devices. As another example, each device can send the update determined by the device to a designated one of the devices, which can combine, i.e., add or average, the updates, apply the combined update to the parameters, and then provide the updated parameters to the other devices. As yet another example, the devices can perform a distributed reduction operation, e.g., using a variant of a circle algorithm, to determine the combined update and apply the update to the parameters, i.e., so that each device has the updated parameter values. A detailed discussion of circle algorithms is provided in "PARALLEL PROCESSING OF REDUCTION AND BROADCAST OPERATIONS ON LARGE DATASETS OF NON-SCALAR DATA," U.S. Pat. No. 10,055,692, filed on Sep. 18, 2017, and incorporated herein by reference in its entirety.

Figure 3:
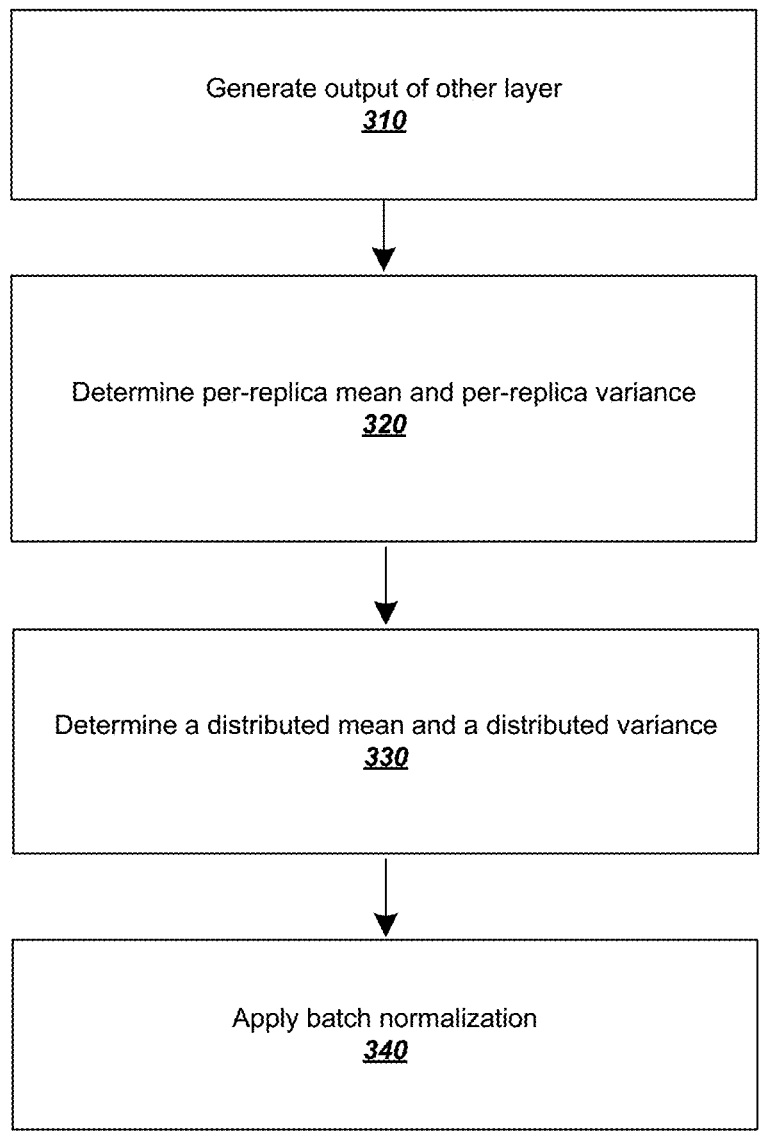
FIG. 3 is a flow chart of an example process for performing distributed batch normalization.

FIG. 3 is a flow chart of an example process 300 for performing the processing of a batch normalization layer using distributed batch normalization. For convenience, the example process will be described as being performed by a system of devices programmed appropriately in accordance with this specification. For example, devices on a replica network, e.g., the devices 124a-n of the replica network 120 of FIG. 1, appropriately programmed, can perform the example process of FIG. 3.

The system can perform the process 300 for each batch normalization layer in the neural network as part of performing the forward pass through the replica maintained by the each of the devices.

Each device in the system generates, using the replica maintained by the device, a respective output of the corresponding other layer for each training example in the batch received by the device (step 310). In particular, the corresponding other layer in the neural network is the layer whose outputs are batch normalized by the batch normalization layer. The device generates the respective outputs by processing each training example in the batch through all of the layers in the neural network up to and including the corresponding other layer.

Each device in the system determines a per-replica mean and a per-replica variance of the respective outputs of the corresponding other layers for the training examples in the batch (step 320). In particular, each device determines the per-replica means and per-replica mean as in conventional batch normalization, i.e., as described above with reference to FIG. 1.

The system determines, for each subgroup of devices, a distributed mean and a distributed variance for the subgroup from the per-replica means and the per-replica variances computed by the devices in the subgroup (step 330). In particular, the distributed mean for a subgroup is the average of the per-replica means computed by the devices in the sub-group. Similarly, the distributed variance for the subgroup is the average of the per-replica variances computed by the devices in the sub-group.

The devices in each sub-group can determine the distributed mean and variance for the sub-group by performing a distributed reduction operation over the network, e.g., over wired links or wireless links, that connects the devices in the sub-group. The system can perform this distributed reduction using any of a variety of conventional techniques, e.g., variants of the circle algorithms described above, that minimize the amount of data that needs to be transmitted between the devices in the sub-group in order to compute the distributed means and variances. Because the number of devices in a sub-group is generally very small relative to the total number of devices in the system (for example, each sub-group may only have 2, 4, or 8 devices while the total number of devices is 512 or 1024), this additional distributed reduction introduces minimal additional computational overhead to the overall training process.

In some implementations, the replica network can include dedicated links for computing reduction operations between the devices in each sub-group that form a respective dedicated reduction network for each sub-group. In some other implementations, the replica network includes dedicated links for use in performing distributed reductions generally between devices on the network that form an overall dedicated reduction network for the replica network, e.g., to perform distributed reduction operations in order to update the parameter values based on computed gradients at each node. In either of these implementations, the devices in each sub-group can use this dedicated reduction network, i.e., either the overall dedicated reduction network or the dedicated reduction network that is specific to the sub-group, in computing the distributed means and variances.

Each device applies batch normalization to the respective outputs of the corresponding other layer using the distributed mean and the distributed variance for the sub-group to which the device belongs (step 340).

That is, the device normalizes each corresponding output using the distributed mean and the distributed variance for the sub-group (instead of the per-replica mean and per-replica variance computed by the device) to generate a normalized output and then scales and shifts the normalized outputs to generate a respective batch normalized output for each training example in the batch received by the device.

Thus, the batch normalized output for a given corresponding output for a given training example in the batch depends not only on the other corresponding outputs for the other training examples in the batch but also on the corresponding outputs for the training examples in the batches assigned to the other devices in the same sub-group as the device.

In particular, referring to Algorithm 1 above, each device replaces the per-replica mean $\mu\beta$ and the per-replica variance $\alpha^2\beta$ with the distributed mean and distributed variance, respectively, and then proceeds to perform the remainder of Algorithm 1 using the distributed means and variances in order to generate batch normalized outputs.

Figure 4:
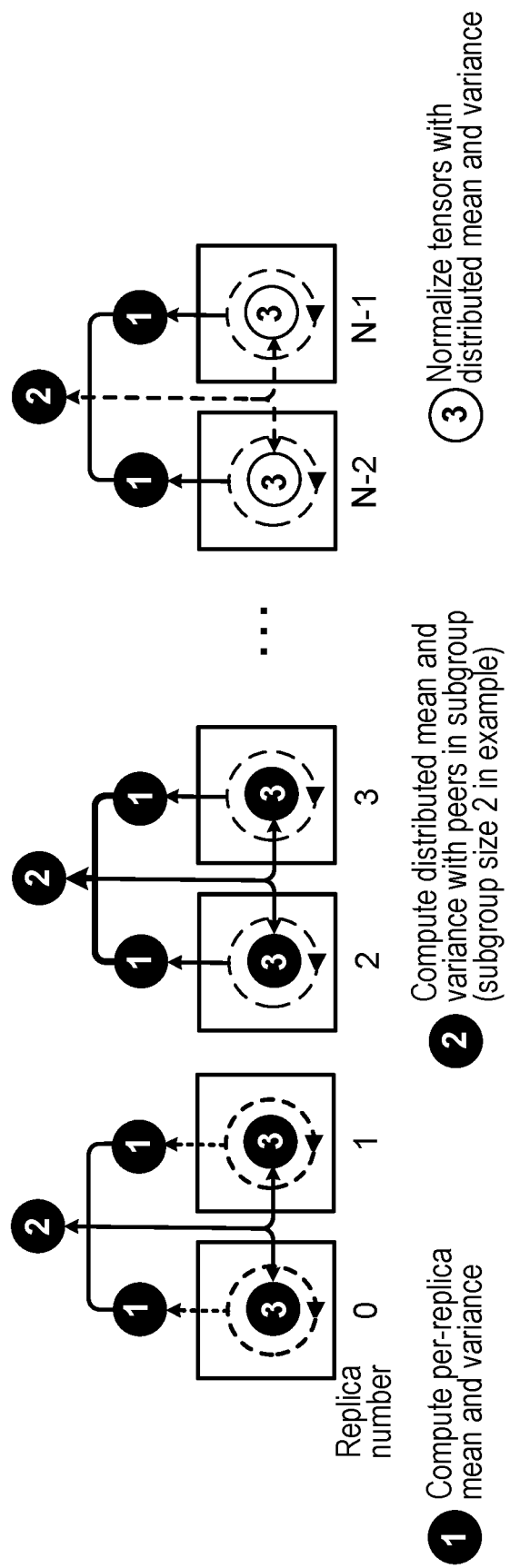
FIG. 4 shows an example of performing distributed batch normalization.

FIG. 4 is an example of applying distributed batch normalization during distributed training of the neural network. In particular, FIG. 4 shows how distributed batch normalization is applied for a single batch normalization layer during the forward pass through the neural network. In practice, the example of FIG. 4 would be repeated for each batch normalization layer in the neural network.

In the example of FIG. 4, the system includes N devices, numbered 0 through N-1. The devices are partitioned into sub-groups of size two, so that, for example, devices 0 and 1 are in the same sub-group, devices 2 and 3 are in the same sub-group, and devices N-2 and N-1 are in the same sub-group.

To apply batch normalization to the outputs of the layer corresponding to the batch normalization layer, in step (1) each device first computes the per-replica means and variances of the outputs of the corresponding layer. This can be done locally on each device.

In step (2), the system then causes each device to compute the distributed mean and distributed variance with the peers of the device that are within the same sub-group. Thus, devices 0 and 1 perform a distributed reduction on their per-replica means and variances to compute a single distributed mean and distributed variance that is obtained by device 0 and device 1. Similarly, devices N-2 and N-1 perform a distributed reduction on their per-replica means and variances to compute a single distributed mean and distributed variance that is obtained by device N−2 and device N−1.

In step (3), each device then normalizes the tensors, i.e., the outputs of the corresponding layer, using the distributed mean and distributed variance obtained by that device. This can also be done locally on each device.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of distributing the training of a neural network across a plurality of devices, wherein the neural network has a plurality of network parameters, wherein the neural network has one or more batch normalization layers, wherein each batch normalization layer applies batch normalization to outputs of a corresponding other layer in the neural network, wherein each device maintains a respective replica of the neural network, and wherein the method comprises:

maintaining data that partitions the plurality of devices into a plurality of sub-groups that each comprise two or more of the plurality of the devices, wherein each of the plurality of devices comprises one or more hardware accelerators for training neural networks;

receiving, at each of the plurality of devices, a respective batch of training examples;

training the neural network on the respective batches of training examples received by the devices, the training comprising:

performing, by each device, a forward pass through the replica maintained by the device to determine a respective network output for each training example in the batch received by the device, comprising, for each batch normalization layer in the neural network:

generating, by each of the plurality of devices and using the replica maintained by the device, a respective output of the corresponding other layer for each training example in the batch received by the device, determining, by each of the plurality of devices, a per-replica mean and a per-replica variance of the respective outputs of the corresponding other layer for the training examples in the batch received by the device;

determining, for each sub-group, a distributed mean and a distributed variance from the per-replica means and the per-replica variances for the two or more devices in the sub-group and determined from the respective batches received by the two or more devices in the sub-group by performing, over a network that connects the two or more devices in the group using one or more communication links, a distributed reduction operation on the per-replica means and the per-replica variances for the two or more devices in the sub-group and determined from the respective batches received by the two or more devices in the sub-group; and applying, by each device, batch normalization to the respective outputs of the corresponding other layer generated by the device using the distributed mean and the distributed variance for the sub-group to which the device belongs; and performing, by each device, a backward pass through the replica maintained by the device to determine a respective update to the parameters of the neural network for each training example in the batch received by the device.

2. The method of claim 1, wherein the neural network is an image processing neural network and the training examples each include (i) one or more input images and (ii) a ground truth output for the one or more input images.

3. The method of claim 1, wherein each sub-group has the same number of devices and the number of devices in each sub-group is greater than one.

4. The method of claim 1, wherein each batch of training examples has the same number of training examples.

5. The method of claim 1, wherein the network is a dedicated reduction network.

6. The method of claim 1, wherein determining, for each sub-group, a distributed mean and a distributed variance from the per-replica means and the per-replica variances for the devices in the sub-group, comprises:

generating the distributed mean by computing an average of the per-replica means for the devices in the sub-group; and generating the distributed variance by computing an average of the per-replica variances for the devices in the sub-group.

7. The method of claim 1, wherein generating, by each of the plurality of devices and using the replica maintained by the device, a respective output of the corresponding other layer for each training example in the batch received by the device comprises:

for each training example, processing the training example through each of the layers up to and including the corresponding other layer in the replica of the neural network.

8. A system comprising one or more computers and one or more storage devices storing instructions that when executed by the one or more computers cause the one or more computers to perform operations for distributing the training of a neural network across a plurality of devices, wherein the neural network has a plurality of network parameters, wherein the neural network has one or more batch normalization layers, wherein each batch normalization layer applies batch normalization to outputs of a corresponding other layer in the neural network, wherein each device maintains a respective replica of the neural network, and wherein the operations comprise:

maintaining data that partitions the plurality of devices into a plurality of sub-groups that each comprise two or more of the plurality of the devices, wherein each of the plurality of devices comprises one or more hardware accelerators for training neural networks;

receiving, at each of the plurality of devices, a respective batch of training examples;

training the neural network on the respective batches of training examples received by the devices, the training comprising:

performing, by each device, a forward pass through the replica maintained by the device to determine a respective network output for each training example in the batch received by the device, comprising, for each batch normalization layer in the neural network:

generating, by each of the plurality of devices and using the replica maintained by the device, a respective output of the corresponding other layer for each training example in the batch received by the device, determining, by each of the plurality of devices, a per-replica mean and a per-replica variance of the respective outputs of the corresponding other layer for the training examples in the batch received by the device;

determining, for each sub-group, a distributed mean and a distributed variance from the per-replica means and the per-replica variances for the two or more devices in the sub-group and determined from the respective batches received by the two or more devices in the sub-group by performing, over a network that connects the two or more devices in the group using one or more communication links, a distributed reduction operation on the per-replica means and the per-replica variances for the two or more devices in the sub-group and determined from the respective batches received by the two or more devices in the sub-group; and applying, by each device, batch normalization to the respective outputs of the corresponding other layer generated by the device using the distributed mean and the distributed variance for the sub-group to which the device belongs; and performing, by each device, a backward pass through the replica maintained by the device to determine a respective update to the parameters of the neural network for each training example in the batch received by the device.

9. The system of claim 8, wherein the neural network is an image processing neural network and the training examples each include (i) one or more input images and (ii) a ground truth output for the one or more input images.

10. The system of claim 8, wherein each sub-group has the same number of devices and the number of devices in each sub-group is greater than one.

11. The system of claim 8, wherein each batch of training examples has the same number of training examples.

12. The system of claim 8, wherein the network is a dedicated reduction network.

13. The system of claim 8, wherein determining, for each sub-group, a distributed mean and a distributed variance from the per-replica means and the per-replica variances for the devices in the sub-group, comprises:

generating the distributed mean by computing an average of the per-replica means for the devices in the sub-group; and generating the distributed variance by computing an average of the per-replica variances for the devices in the sub-group.

14. The system of claim 8, wherein generating, by each of the plurality of devices and using the replica maintained by the device, a respective output of the corresponding other layer for each training example in the batch received by the device comprises:

for each training example, processing the training example through each of the layers up to and including the corresponding other layer in the replica of the neural network.

15. One or more non-transitory computer-readable storage media storing instructions that when executed by one or more computers cause the one or more computers to perform operations for distributing the training of a neural network across a plurality of devices, wherein the neural network has a plurality of network parameters, wherein the neural network has one or more batch normalization layers, wherein each batch normalization layer applies batch normalization to outputs of a corresponding other layer in the neural network, wherein each device maintains a respective replica of the neural network, and wherein the operations comprise:
    maintaining data that partitions the plurality of devices into a plurality of sub-groups that each comprise two or more of the plurality of the devices, wherein each of the plurality of devices comprises one or more hardware accelerators for training neural networks;
    receiving, at each of the plurality of devices, a respective batch of training examples;
    training the neural network on the respective batches of training examples received by the devices, the training comprising:
        performing, by each device, a forward pass through the replica maintained by the device to determine a respective network output for each training example in the batch received by the device, comprising, for each batch normalization layer in the neural network:
            generating, by each of the plurality of devices and using the replica maintained by the device, a respective output of the corresponding other layer for each training example in the batch received by the device,
            determining, by each of the plurality of devices, a per-replica mean and a per-replica variance of the respective outputs of the corresponding other layer for the training examples in the batch received by the device;
            determining, for each sub-group, a distributed mean and a distributed variance from the per-replica means and the per-replica variances for the two or more devices in the sub-group and determined from the respective batches received by the two or more devices in the sub-group by performing, over a network that connects the two or more devices in the group using one or more communication links, a distributed reduction operation on the per-replica means and the per-replica variances for the two or more devices in the sub-group and determined from the respective batches received by the two or more devices in the sub-group; and
            applying, by each device, batch normalization to the respective outputs of the corresponding other layer generated by the device using the distributed mean and the distributed variance for the sub-group to which the device belongs; and
        performing, by each device, a backward pass through the replica maintained by the device to determine a respective update to the parameters of the neural network for each training example in the batch received by the device.

16. The computer-readable storage media of claim 15, wherein each sub-group has the same number of devices and the number of devices in each sub-group is greater than one.

17. The computer-readable storage media of claim 15, wherein determining, for each sub-group, a distributed mean and a distributed variance from the per-replica means and the per-replica variances for the devices in the sub-group, comprises:
    generating the distributed mean by computing an average of the per-replica means for the devices in the sub-group; and
    generating the distributed variance by computing an average of the per-replica variances for the devices in the sub-group.

18. The computer-readable storage media of claim 15, wherein the network is a dedicated reduction network.

19. The computer-readable storage media of claim 15, wherein the neural network is an image processing neural network and the training examples each include (i) one or more input images and (ii) a ground truth output for the one or more input images.

\* \* \* \* \*

UNITED STATES PATENT AND TRADEMARK OFFICE
CERTIFICATE OF CORRECTION

| | | |
|---|---|---|
| PATENT NO. | : 11,907,825 B2 | Page 1 of 1 |
| APPLICATION NO. | : 16/659543 | |
| DATED | : February 20, 2024 | |
| INVENTOR(S) | : Hechtman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1127 days.

Signed and Sealed this
Thirty-first Day of December, 2024

Derrick Brent
*Acting Director of the United States Patent and Trademark Office*